April 12, 1966 R. M. WEYGANDT ETAL 3,245,211
APPARATUS FOR AND METHOD OF HARVESTING BERRIES AND SIMILAR
PRODUCE FROM BUSHES
Filed Nov. 16, 1964 2 Sheets-Sheet 1
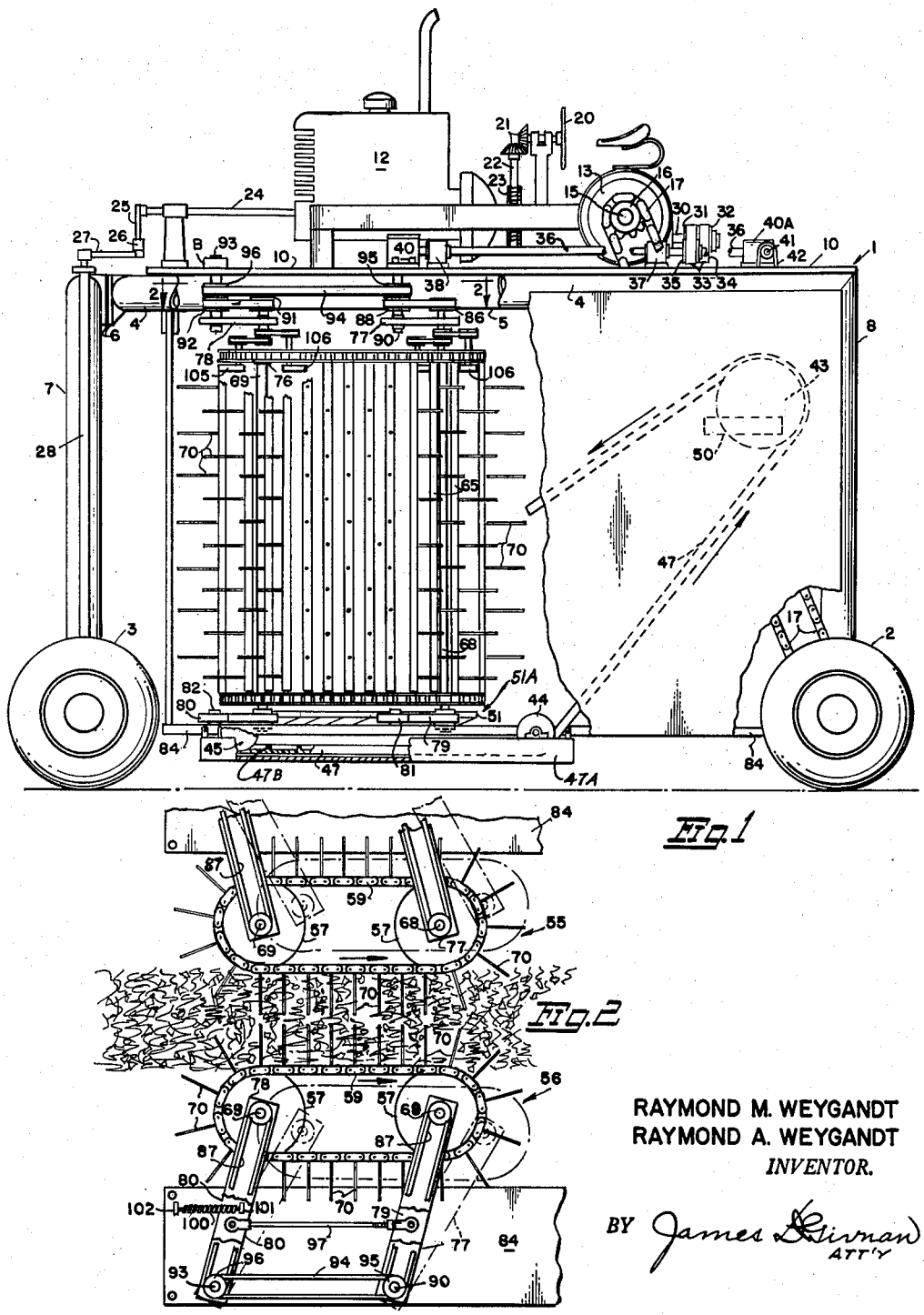
RAYMOND M. WEYGANDT
RAYMOND A. WEYGANDT
*INVENTOR.*
BY James Givnan
ATT'Y

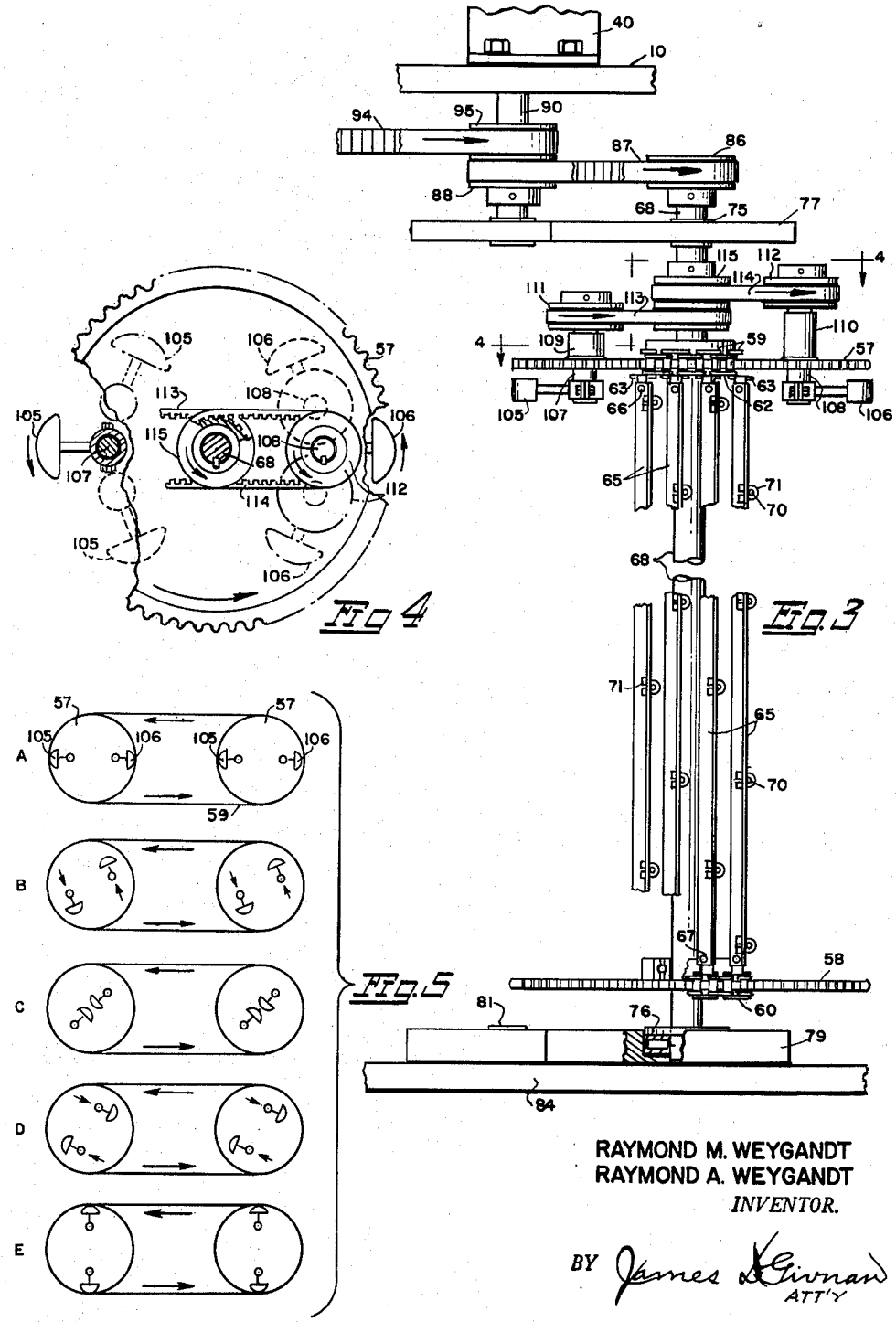

United States Patent Office

3,245,211
Patented Apr. 12, 1966

3,245,211
APPARATUS FOR AND METHOD OF HARVEST-
ING BERRIES AND SIMILAR PRODUCE FROM
BUSHES
Raymond M. Weygandt and Raymond A. Weygandt,
both of Rte. 1, Box 308, Canby, Oreg.
Filed Nov. 16, 1964, Ser. No. 411,215
2 Claims. (Cl. 56—330)

This invention relates to apparatus for harvesting ripe fruit such as berries and the like from vines or bushes arranged in parallel rows.

Since such fruit, when in prime condition, may be readily shaken from the fruit canes, it is one of the principal objects of the present invention to provide a row-straddling machine propelled and controlled by an operator and provided with frictionally rotatable harvesting instrumentalities cooperating with power-driven instrumentalities for imparting reciprocatory shaking motion direct to the fruit canes in the direction of the length of each row to effect complete removal of ripe fruit therefrom. This cane-shaking motion on horizontal planes is imparted to the bush foliage throughout the height thereof.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of a harvesting machine embodying the principles of the invention. Fragments of the machine are broken away to reveal internal parts.

FIGURE 2 is a fragmentary top plan view of FIGURE 1 showing two cooperating fruit dislodging units and actuating mechanism disposed on the interior of the machine.

FIGURE 3 is a fragmentary side elevational view on an enlarged scale of one of the typical fruit dislodging instrumentalities and actuating mechanism, with fragments broken away for convenience of illustration.

FIGURE 4 is a fragmentary sectional top plan view taken approximately along the line 4—4 of FIGURE 3, and FIGURE 5 is a composite diagrammatic plan view of the unit in the top half of FIGURE 2 illustrating the range of functional stages of its respective means for imparting alternate accelerated and decelerated speeds of rotation to the fruit dislodging instrumentalities.

With continuing reference to the drawings wherein like reference characters designate like parts and particularly FIGURE 1 thereof, the self-propelled harvesting machine illustrated therein comprises a main frame indicated generally at 1 supported upon ground-engaging traction wheels 2 and steerable idling wheels 3. The top of the frame 1 comprises longitudinal members 4 and 5 whose forward end is attached by wearplates 6 to the top of an inverted U-shaped front frame 7. The rearward end of the members 4–5 are fixedly secured to the top end of an inverted rear frame 8.

A deck 10 is secured to the longitudinal members 4 and 5 by any suitable means and mounted thereon is an internal combustion engine 12 of any suitable type and horsepower connected in the conventional manner through a differential 13 to a power-output shaft 15. Both ends of the shaft 15 are provided with sprocket wheels 16 connected by sprocket chains 17 to the axles of the traction wheels 2 for driving the same.

The machine is maneuverable by any suitable steering mechanism comprising a steering wheel 20, bevel gears 21, worm and worm gears 22–23, steering column 24 connected by a crank arm 25 to a tie-rod 26 which is connected to the inner end of arms 27 connected as at 28 to the steerable wheels 3 in any approved manner.

Secured to a second power take off shaft 30, also driven by the differential 13, are two driving pulleys 31–32 having belts 33 entrained thereover and over right and left driven pulleys 34 and 35 as viewed from the rear of the machine. The pulleys 34–35 are secured to their respective driven shafts 36 which are journaled in aligned bearings 37 and 38 secured to the deck 10. The shafts 36 terminate at their forward ends in a driving connection with speed reducers 40, also secured to the deck 10, and at their rearmost ends with a second pair of speed reducers 40A whose output shafts and pulleys 41 secured thereto are connected by chains or belt drives 42 to the driven pulleys 43 of a conveyor system including driven pulleys 44 and 45 under which the bottom run of conveyor belts 47 are entrained. The conveyor belts operate in the direction of the arrows applied to them so that by belt inversion over the pulleys 43 dislodged fruit collected upon and carried by the belts will gravitate into any suitable receptacle 50 disposed on the interior of the machine.

The bottom run of the belts 47 are slidably supported by trays 47A secured in any suitable manner to the bottom side plates 84 of the machine. The belts are provided with transverse buckets 47B. The outer edges of the overlapping shutter-like plates 51 of the flooring 51A overlie the inner edges of the belts 47. The plates are spring-urged to the normally closed position shown but progressively open and close about the stalks of the bushes in a row as the machine moves forwardly therealong. The shutter-plates, as shown in FIGURE 1, are inclined outwardly and downwardly from the centerline of the machine to their outer edges which overhang the belts as aforesaid, so harvested berries dropping onto the flooring will gravitate into the buckets 47B of the conveyor belts.

The machine thus far described, except for the shafts 30, 36, their related parts, including pulleys, belts and bearings, is exemplary of any such vehicle capable of collecting and conveying fruit dislodged by the harvesting mechanism of the invention.

This shutter-like flooring and conveyor structure, which form no part of the present invention as claimed herein, are clearly shown and described in our United States Patent No. 3,126,692 dated March 31, 1964.

The fruit dislodging components, their supports and actuating mechanisms, as illustrated in FIGURE 2, comprise two cooperating units indicated generally at 55 and 56 which, except for their right and left hand disposition within the machine, are identical and therefore a description of one will suffice for both.

As best illustrated in FIGURES 2 and 3, each of said units comprises a pair of top idling sprocket wheels 57 and a pair of matching bottom idling sprocket wheels 58 about which are entrained top and bottom sprocket chains 59 and 60 respectively. The chains are made up of attachment links 62 having outwardly extending lugs 63 integral therewith and to which vertically disposed angle sections 65 are secured at their top and bottom ends as at 66–67. Both pairs of top and bottom sprocket wheels 57–58 are freely rotatable about their vertically disposed supporting shafts 68–69 to thus render each unit and its related parts free-wheeling relative to each row of bushes to be dealt with.

A plurality of bush or plant agitating tines 70 are secured in staggered relation to each other to the angle sections 65 by clamping bolts 71. The tines are non-metallic and preferably, though not restrictively, made of material in the nature of rattan which, because of its great strength and flexibility within certain limits, we have found by experiment to be satisfactory for the purpose intended as will become subsequently apparent.

The top and bottom ends of the shafts 68–69 are journaled in bearings 75–76 carried by the free or inner ends of top and bottom supporting arms 77–78 and 79–80 respectively. The bottom arms 79–80 are swingably attached as at 81–82 to bottom plates 84 on both sides of the machine.

The top end of the shaft 68 (FIG. 3) is provided with a pulley 86 belt-driven as at 87 by a pulley 88 secured to and driven by a shaft 90 depending from and driven by the speed reducer 40.

The top end of the other shaft 69 (FIG. 1) is similarly provided with a pulley 91 belt driven by a pulley 92 secured to a vertical shaft 93 depending from the deck 10 and journaled in a bearing B mounted thereupon. A belt 94 is entrained over driven pulleys 95–96 secured respectively to the shafts 90 and 93 for driving both of them simultaneously by the speed reducer 40.

From the foregoing, it will be apparent that such power driven rotation of the shafts 68 and 69 will not interfere with the free rotation of the top and bottom sprocket wheels 57 and 58 about their respective supporting shafts, and hence the free wheeling operation of each unit 55–56 as aforesaid.

The bottom supporting arms 79–80 as well as the top arms 77–78 are normally held in parallel relation to each other by a longitudinally adjustable tie-rod 97 which can be lengthened or shortened to vary the relationship of the arms to tighten or loosen the sprocket chains 59 and 60 entrained over the sprocket wheels 57 and 58 when desirable or necessary.

Both pairs of arms in each unit are yieldingly held in the full line position shown in FIG. 2 for normal operation by a tension spring 100 secured as at 101 to each bottom arm 80 and to each bottom side plate 84 as at 102. Thus, either unit can by-pass an encountered obstruction by swinging rearwardly in an arcuate path as indicated by broken lines.

With the harvesting machine straddling a row crop as it travels to the left therealong and with the tines 70 penetrating the bushes from both sides thereof as illustrated in FIG. 2, it will be apparent that the friction drive resulting from such penetration will cause the opposing inner runs of the sprocket chains 59, in both units 55–56, to move steadily to the right as their top and bottom pairs of sprocket wheels rotate freely about their supporting shafts 68–69. Therefore, since the bushes are acting on the tines, the entering penetration of the tines into, along and removal from the bushes will not be damaging to the bush foliage.

To impart the highly important lineal vibratory berry-dislodging rhythmical motion or pulsations to the tines whether the machine is in motion or at a standstill and in either case independent of the sprocket wheels whether rotating or stationary, we provide the underside of each of the top sprocket wheels 57 (FIGS. 3 and 4) with a pair of weighted eccentrics 105–106. These eccentrics are secured to stub shafts 107–108 journaled in vertically disposed bearings 109–110 secured at diametrically opposed points on the top of the sprocket wheels. The top ends of the stub shafts are provided with pulleys 111–112 belt driven as at 113–114 by pulleys 115 secured to and rotatable with the shafts 68 and 69.

When the two units 55 and 56 are in operation as aforesaid with the inner or opposing runs of their respective sprocket chains 59 traveling in the direction of the applied arrows in FIG. 2, and assuming that the detailed assembly shown in FIG. 3 represents the top right hand component in unit 55 in FIG. 2, and that the speed-reducer shaft 90 (FIG. 3) and pulleys 95 and 98 secured thereto are rotating in a counterclockwise direction as indicated by applied arrows, then the shaft 68, pulley 115 secured thereto, pulleys 111–112 and the weighted eccentrics 105–106 will be put into counterclockwise rotation as their axes (vertical stub shafts 107–108) of such rotation orbit about the axis (shaft 68) of counterclockwise rotation of the top and bottom sprocket wheels 57–58 while the same, along with their chain-driven companion sprocket wheels 57–58 in the same unit 55 are rolled along in the same direction by the frictional drive of the bushes acting on the tines 70 as aforesaid.

Both units 55–56, being identical, are rendered synchronous in operation by their common driving connection with the power output shaft 30 of the differential 13, and because of their right and left hand disposition, the direction of rotation of the parts in unit 56 will be clockwise or opposite to the counterclockwise rotation of their counterparts in unit 55.

Each of the illustrations in composite FIGURE 5 is symbolic of the top unit 55 in FIGURE 2 and its operational sequences indicated at A, B, C, D and E are as follows:

At A, C and E, the weighted eccentrics 105–106 are in diametric alignment with their respective sprocket wheels 57 and therefore their eccentricities are momentarily balanced thus sprocket chain and tine movement will be constant.

At B, where the tangential thrust loads imparted to the sprocket wheels are in the same direction of rotation as that of the sprocket wheels, the movement of the chains and hence tine impingement against the fruit vines will be accelerated, and at D, where such thrust loads are in an opposite direction, the movement of the chains and tines will be decelerated to cause momentary reverse impingement.

While we have shown a particular form of embodiment of our invention, we are aware that many minor changes therein will readily suggest themselves to others skilled in the art without departing from the spirit and scope of the invention. Having thus described our invention, what we claim as new and desire to protect by Letters Patent is:

1. A machine for harvesting ripe fruit and similar produce from plants arranged in row formation comprising,
  a frame,
  ground-engaging wheels supporting said frame for travelling along a row,
  two opposing fruit dislodging units disposed one on each side of the frame,
  each of said units comprising a pair of horizontally disposed top idling rotary members and a pair of matching bottom idling rotary members,
  top and bottom means circumscribing each pair of said rotary members and providing a driving connection therebetween,
  vertically disposed means interconnecting said top and bottom circumscribing means in each of said units,
  a plurality of horizontally disposed yieldable tines secured to and extending outwardly from said vertical interconnecting means whereby said tines upon penetration into the bushes from both sides thereof will impart rotation to said units as the machine travels along a row,
  power-driven eccentrics rotatably mounted on each of the top pair of said rotary members about diametrically opposed axes of rotation and rotatably driven at a greater r.p.m. than the orbital rotation of their said axes with said rotary members.

2. In a machine for harvesting fruit from bushes growing in row formation as the machine travels along a row, comprising in combination,
  bush-penetrating means,
  means mounting said penetrating means for idling orbital rotation in a horizontal plane, said idling rotation imparted to said bush-penetrating means by their penetration into the bushes as the machine travels along a row, eccentric rotary means associated with said bush-penetrating means, a power source carried by the machine, a driving connection between said power source and said eccentric means for imparting reciprocatory motion in a horizontal plane to said mounting the bush-penetrating means and hence to the bushes in the direction of the length of the row independent of the rotation imparted to the penetrating means by the travel of the machine.

References Cited by the Examiner
UNITED STATES PATENTS

| | | | |
|---|---|---|---|
| 193,702 | 7/1877 | Graves | 56—49 |
| 2,760,324 | 8/1956 | Stukenborg et al. | 56—11 |
| 2,891,372 | 6/1959 | Goodwin | 56—328 |
| 3,035,387 | 5/1962 | Bevill | 56—28 |

ABRAHAM G. STONE, *Primary Examiner.*

RUSSELL R. KINSEY, *Examiner.*

Disclaimer

3,245,211.—*Raymond M. Weygandt* and *Raymond A. Weygandt*, Canby, Oreg. APPARATUS FOR AND METHOD OF HARVESTING BERRIES AND SIMILAR PRODUCE FROM BUSHES. Patent dated Apr. 12, 1966. Disclaimer filed Mar. 7, 1968, by the inventors.

Hereby enter this disclaimer to claim 2 of said patent.

[*Official Gazette August 13, 1968.*]